United States Patent
Heriban

(10) Patent No.: US 11,878,413 B2
(45) Date of Patent: Jan. 23, 2024

(54) DEVICE FOR A MICROACTUATOR, AND MICROACTUATOR EQUIPPED WITH SUCH A DEVICE

(71) Applicant: PERCIPIO ROBOTICS, Besançon (FR)

(72) Inventor: David Heriban, Besançon (FR)

(73) Assignee: PERCIPIO ROBOTICS, Besançon (FR)

( * ) Notice: Subject to any disclaimer, the term of this patent is extended or adjusted under 35 U.S.C. 154(b) by 0 days.

(21) Appl. No.: 17/776,208

(22) PCT Filed: Nov. 12, 2020

(86) PCT No.: PCT/EP2020/081837
§ 371 (c)(1),
(2) Date: May 11, 2022

(87) PCT Pub. No.: WO2021/094415
PCT Pub. Date: May 20, 2021

(65) Prior Publication Data
US 2022/0388149 A1    Dec. 8, 2022

(30) Foreign Application Priority Data
Nov. 13, 2019  (FR) ...................................... 1912663

(51) Int. Cl.
*B25J 7/00*      (2006.01)
*B25J 9/00*      (2006.01)

(52) U.S. Cl.
CPC ............... *B25J 7/00* (2013.01); *B25J 9/0015* (2013.01)

(58) Field of Classification Search
CPC .................................. B25J 7/00; B25J 9/0015
(Continued)

(56) References Cited

U.S. PATENT DOCUMENTS 4,667,997 A * 5/1987 Udagawa ............... B25J 13/082
294/99.1
5,046,773 A * 9/1991 Modesitt ................ B25J 9/0015
294/196
(Continued)

FOREIGN PATENT DOCUMENTS

CN   105236349 A   1/2016
CN   105406755 A   3/2016
(Continued)

OTHER PUBLICATIONS

F. Wang et al. "Design of a Novel Dual-Axis Micromanipulator With an Asymmetric Compliant Structure," in IEEE/ASME Transactions on Mechatronics, vol. 24, No. 2, pp. 656-665, Apr. 2019, doi: 10.1109/TMECH.2019.2893681.

*Primary Examiner* — Paul T Chin
(74) *Attorney, Agent, or Firm* — Volpe Koenig

(57) ABSTRACT

A device for a microactuator comprises a body (110), two terminal members (20, 22) articulated (136, 138) on the body (110), which are situated on one side of the latter, and two deformable bowl-shaped walls (120, 122) which face one another. The walls are configured to house an actuator, with two respective first edges (1202, 1222) of these walls (120, 122) situated on one side being fixed (1264) to the body (110), whereas two respective second edges (1204, 1224) of these walls (120, 122) situated on another side move consecutively to a deformation of the walls (120, 122) under the effect of the actuator. This movement is transmitted by two arms (132, 134) which terminate at the two respective terminal members (20, 22).

14 Claims, 4 Drawing Sheets

(58) Field of Classification Search
USPC .................................................. 294/99.1, 213
See application file for complete search history.

(56) References Cited

U.S. PATENT DOCUMENTS

| | | | | |
|---|---|---|---|---|
| 7,322,622 | B2* | 1/2008 | Hashiguchi | B81C 99/002 |
| | | | | 294/86.4 |
| 7,431,364 | B2* | 10/2008 | Huang | B81C 99/002 |
| | | | | 294/99.1 |
| 8,317,245 | B2* | 11/2012 | Sun | B25J 9/104 |
| | | | | 294/213 |
| 8,979,149 | B2* | 3/2015 | Sun | B25J 7/00 |
| | | | | 294/86.4 |
| 9,180,594 | B2 | 11/2015 | Heriban et al. | |
| 10,294,041 | B2* | 5/2019 | Mallitzki | B65G 47/908 |
| 11,034,033 | B2 | 6/2021 | Andre | |
| 2006/0014196 | A1* | 1/2006 | Konno | B25J 15/00 |
| | | | | 435/287.2 |
| 2006/0043749 | A1* | 3/2006 | Huang | B25J 15/12 |
| | | | | 294/99.1 |
| 2009/0278420 | A1* | 11/2009 | Sun | B25J 9/0015 |
| | | | | 310/308 |
| 2017/0030403 | A1 | 2/2017 | Kurose et al. | |

FOREIGN PATENT DOCUMENTS

| | | |
|---|---|---|
| CN | 109231152 A | 1/2019 |
| EP | 2718066 B1 | 3/2016 |
| FR | 3071424 A1 | 3/2019 |
| JP | H05293778 A | 11/1993 |

\* cited by examiner

[Fig. 1]
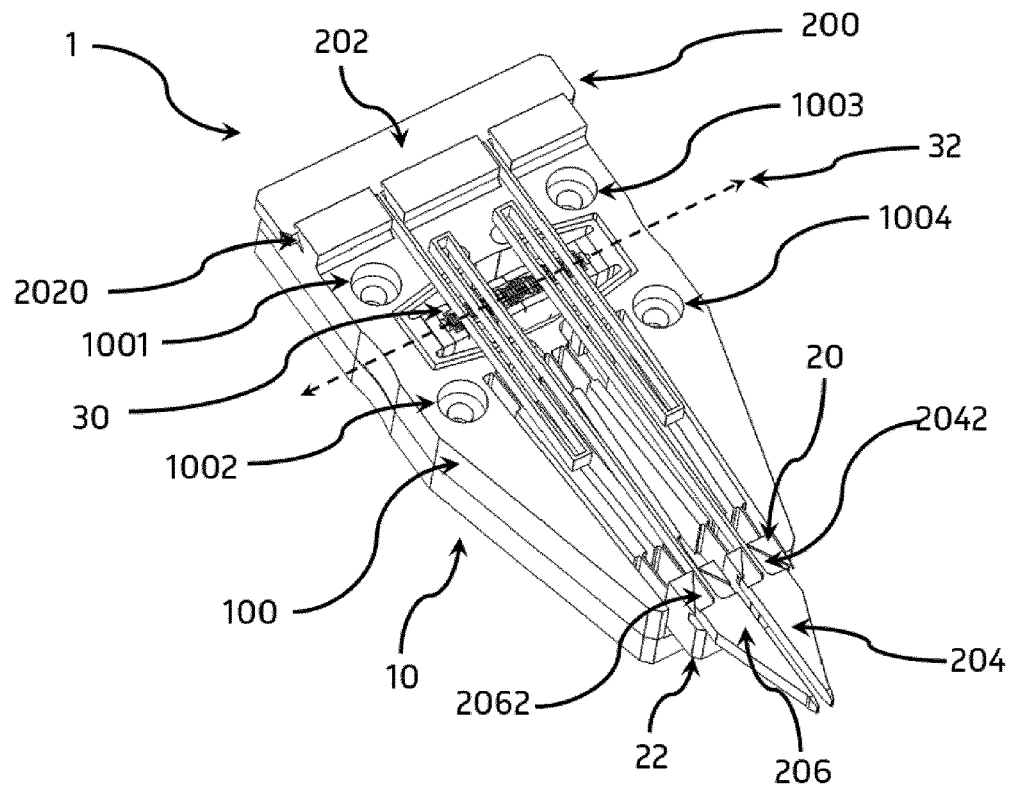
[Fig. 2]
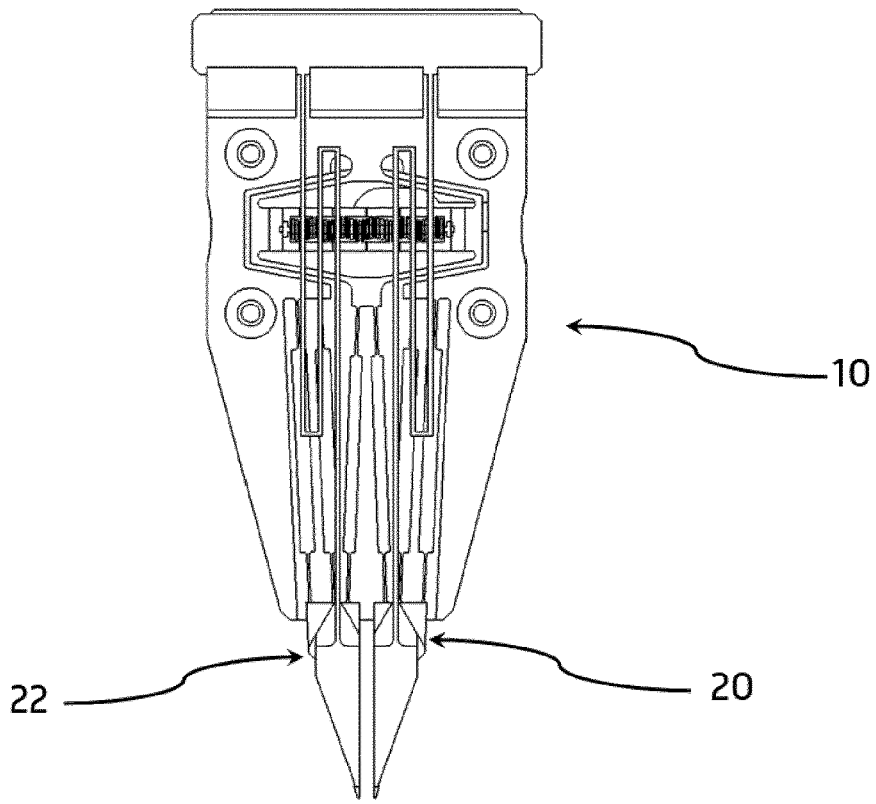

[Fig. 3]
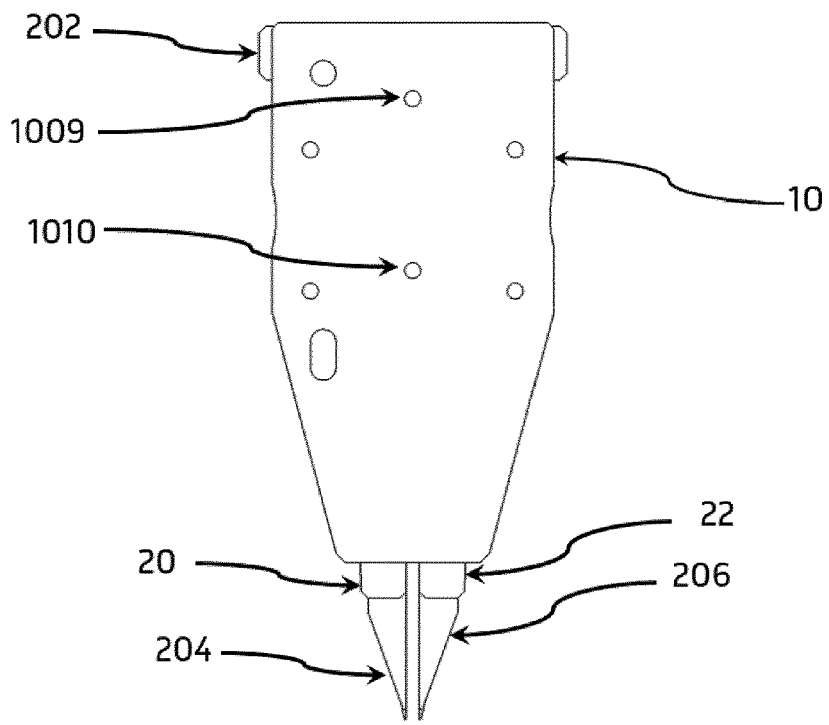
[Fig. 4]
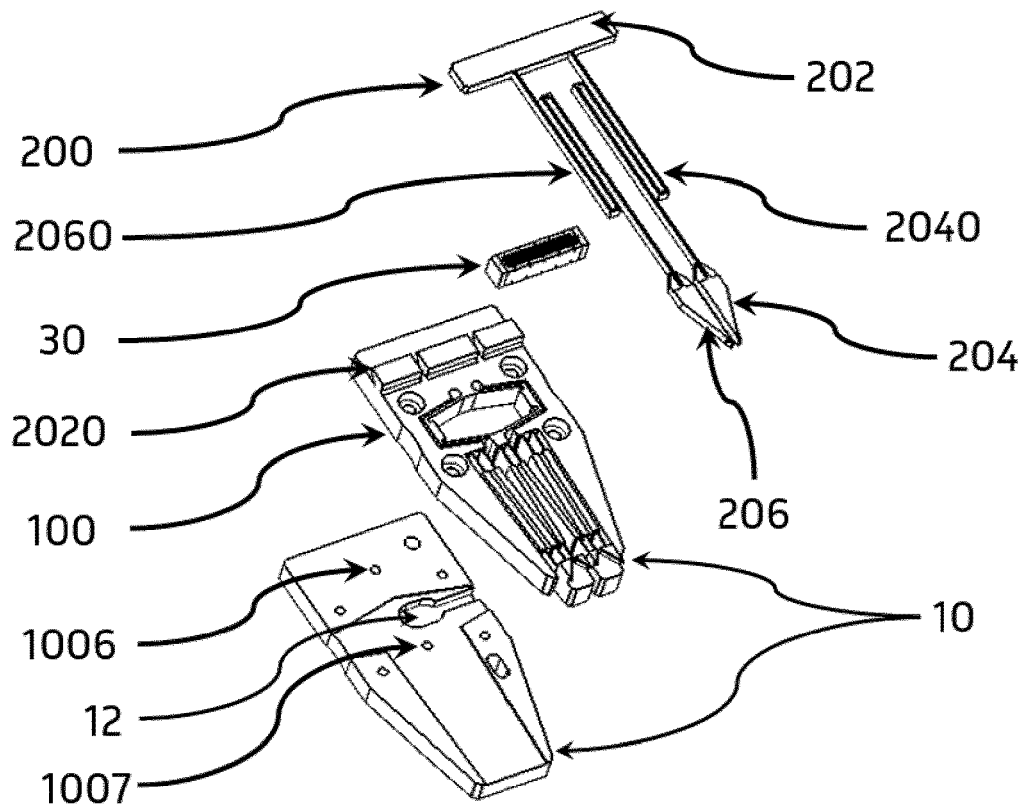

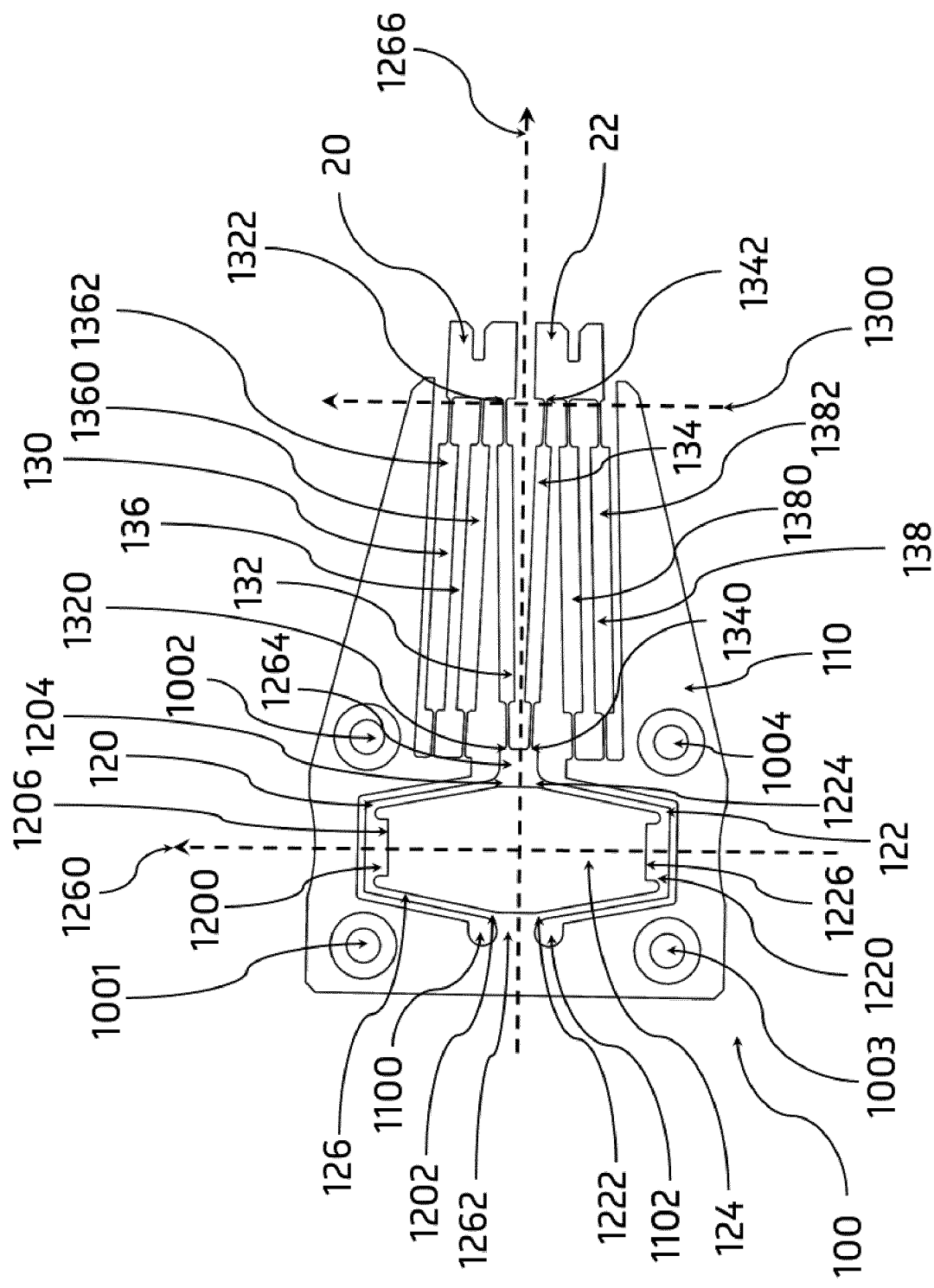
[Fig. 5]

[Fig. 6]
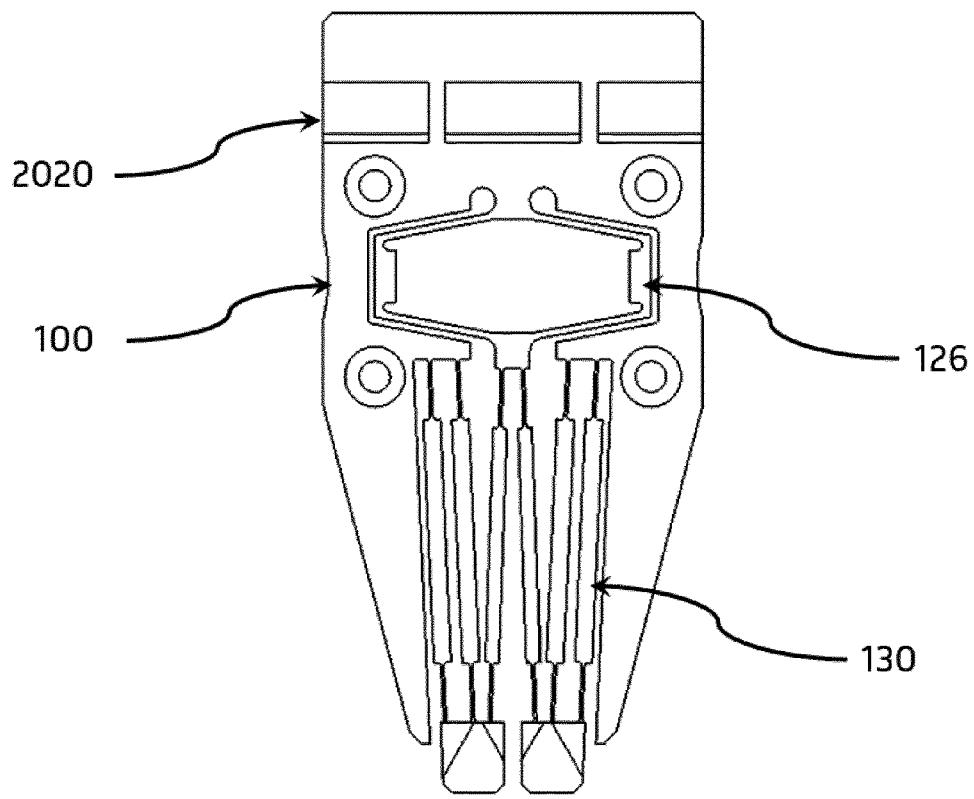
[Fig. 7]
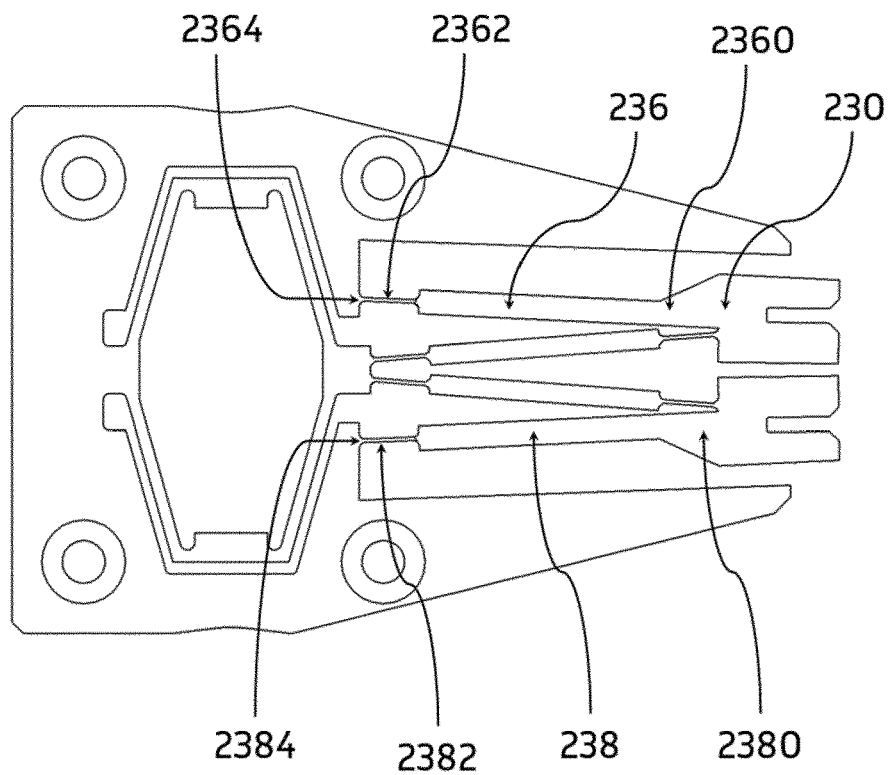

DEVICE FOR A MICROACTUATOR, AND MICROACTUATOR EQUIPPED WITH SUCH A DEVICE

FIELD OF THE INVENTION

The invention relates to the field of devices for microactuators, and in particular for microtechnology clamps.

BACKGROUND

Microactuators are mechanical devices capable of producing movements over very short distances (hereinafter called actuator travel). In particular, microtechnology clamps are microactuators carrying out the grasping of small objects by means of fingers that move along an actuator travel. These fingers are generally mounted on finger carriers, also called terminal members.

Microtechnology clamps, and more generally microactuators, are most often driven by a piezoelectric actuator capable of expanding and contracting, i.e. be deformed, under the action of an electric field. A piezoelectric actuator generally has the form of a stack, along a stack direction. This stack is deformed longitudinally, controlled by an electric field passing through it over its length. This controlled deformation allows for a precise grasping over very short distances.

The travel of a piezoelectric stack is about one thousandth (1/1000) of its length. The actuator travel required for industrial applications must be at least 400 µm. In order to obtain an actuator travel over compactness ratio of the microtechnology clamp that is reasonable, microtechnology clamps comprise an amplifying structure between the piezoelectric stack and the finger carriers. This amplifying structure transforms the deformation of the piezoelectric stack into a movement of the finger carriers by multiplying it by an amplification factor.

However, the current amplifying structures for microactuators are not satisfactory.

The amplification factor of the known amplifying structures is low, in general less than 5:1. Hence, microtechnology clamps take up a lot of space, up to 500 mm long. Their integration into an industrial chain is complex, even impossible.

These amplifying structures are based on the complex assembly of a large number of fragile elements, such as for example patent FR 1758847 which describes a microtechnology clamp the amplifying structure of which is three-dimensional and with a membrane. The known microtechnology clamps are not adapted to mass production, and their service life is low.

In certain known amplifying structures, the movement of the fingers does not preserve their orientation and is asymmetrical. Microtechnology clamps are known of which a single finger is mobile, or of which the two fingers are driven by different movements. Such microtechnology clamps are difficult to use for the precise manipulations imposed by industrial applications.

The article Wang, Fujun et al. "Design of a Novel Dual-Axis Micromanipulator With an Asymmetric Compliant Structure," IEEE/ASME Transactions on Mechatronics 24 (2019): 656-665 is in particular known which describes an amplifying structure of which the amplification ratio can reach 11:1 for one of the fingers and 4.6:1 for the other finger. This amplifying structure has an amplification factor greater than the other known amplifying structures, but at the price of high asymmetry. In addition, its large number of parts makes it complex, fragile and unusable.

The invention improves the situation.

SUMMARY

In this regard, the invention proposes a device for a microactuator comprising
a body,
two terminal members articulated on the body, located on one side of the latter,
two deformable bowl-shaped walls which face one another, arranged to house an actuator, two respective first edges of these walls located on one side being fastened on the body, whereas two respective second edges of these walls located on another side move consecutively to a deformation of the walls under the effect of the actuator,
this movement being transmitted by two arms which terminate at the two respective terminal members.

The amplification factor of the device of the invention is high. It can exceed 30:1 (or 30/1), i.e. for 1 µm of longitudinal deformation of the actuator, the terminal members move at least 30 µm, even 50:1. This device is furthermore easy to manufacture. The solidity of the device is moreover much higher than that of conventional structures, due to the low number of parts and their simplicity.

In various alternatives, the device for a microactuator can furthermore have one or more of the following characteristics:
  the bowl-shaped walls each have a respective bottom against which the actuator bears,
  the two terminal members are articulated on the body by respective rods,
  the two terminal members are articulated on the body by two respective pairs of rods substantially parallel and of the same length,
  the ends of the rods on the terminal member side are substantially aligned,
  the deformation of the actuator is a longitudinal expansion or a longitudinal contraction against the two bottoms of the walls, an expansion of the actuator against the two bottoms drives the coming closer together of the first edges and of the second edges, by which the second edges symmetrically drive a relative coming closer together of the terminal members via arms,
  and
  a contraction of the actuator against the two bottoms drives the moving apart of the first edges and of the second edges, by which the second edges symmetrically drive a relative moving apart of the terminal members via arms,
  the relative coming closer together and the relative moving apart of the terminal members is generally expressed along a linear travel,
  the two bowl-shaped walls generally form a diamond, a hexagon or an oval,
  the device is made from a single piece,
  the device is formed from a profiled plate,
  the device has an amplification factor greater than 30:1,
  the rods and/or the arms are thinned at one or more of their ends,
  the microactuator is a microtechnology clamp, and the terminal members each comprise a finger carrier and a finger mounted on said finger carrier,
  the actuator is a piezoelectric actuator, preferably a piezoelectric stack, the device is symmetrical with respect to a plane of symmetry located between the two walls, between the two arms and between the two terminal members.

BRIEF DESCRIPTION OF THE DRAWINGS

Other characteristics and advantages of the invention will be exposed in detail in the description hereinafter, given in reference to the accompanying drawings, wherein:

FIG. 1 shows a perspective view of a microactuator provided with a microtechnology device according to the invention, FIG. 2 shows a top view of the microactuator of FIG. 1, FIG. 3 shows a bottom view of the microactuator of FIG. 1, FIG. 4 shows an exploded view of the microactuator of FIG. 1, FIG. 5 shows a bottom view of the device of FIG. 1, FIG. 6 shows a top view of the device of FIG. 5

FIG. 7 shows an alternative of the device of FIG. 5.

DETAILED DESCRIPTION OF THE PREFERRED EMBODIMENTS

The accompanying drawings contain, for the most part, elements of a certain nature. They can therefore not only be used to understand the present invention better, but also to contribute to the definition thereof, where applicable.

Reference is now made to FIGS. 1 to 6.

A microactuator 1 comprises a base 10, two terminal members 20 and 22, and an actuator 30 to actuate said terminal members 20 and 22.

In an embodiment, the microactuator 1 is a microtechnology clamp and the terminal members are grasping members, for example finger carriers that can each receive a finger. The actuator 30 can actuate the finger carriers 20 and 22 in order to carry out a grasping by the microactuator 1.

The finger carriers 20, 22 can receive respective fingers to form a microtechnology clamp. In an embodiment, the microactuator 1 comprises an endpiece 200, mounted on the base 10, including a support 202 and two fingers 204 and 206 connected to the support 202 by a respective flexible connection element 2040, 2060, such as is described in patent EP2718066 of the Applicant. Each finger 204, 206 comprises a respective fastening base 2042, 2062 by which it is fastened on one of the finger carriers 20, 22, here by form-fitting. The support 202 can engage in a notch 2020 arranged in the base 10, in order to mount the endpiece 200 on the base 10. Alternatively, as described in patent EP2718066, the support could be mounted in a groove arranged in the base 10. Alternatively, the fingers could be formed from a single piece with the finger carriers 20 and 22. The fingers could alternatively be fastened to the base by screwing and/or gluing.

Here, the actuator 30 is a piezoelectric actuator. The actuator 30 is able to be deformed, i.e. expand and contract, along an actuator direction 32, according to the electric field passing through it. This deformation is bidirectional, i.e. the actuator 30 can expand in both directions along its actuator direction 32. The actuator 30 here has the form of a parallelepiped piezoelectric stack along the actuator direction 32. The piezoelectric stack can be a stack of the brand PI, for example the parallelepiped model P-883.30 with dimensions 3×3×13.5 mm. Alternatively, the actuator 30 could be an electromagnetic or thermal actuator.

The microactuator 1 can be mounted on an industrial device, for example fastened to the end of a robotic arm. The base 10 of the microactuator 1 is for example provided with two holes 1009 and 1010 via which the microactuator 1 can be fastened.

In the example described here, the base 10 of the microactuator comprises, on one of its sides, a recess 12 used to pass one or more cables for the power supply and control of the actuator 30.

The microactuator 1 further comprises an amplifying structure 100 to transmit the movement of the actuator 30 to the finger carriers 20 and 22. The structure 100 is here generally flat. The structure 100 can be manufactured in a plate 3.5 mm thick. Said plate can for example be made from aluminum, steel or silicon. The structure 100 is fastened to the base 10, here screwed via four screw holes 1001, 1002, 1003 and 1004. The structure 100 houses the actuator 30 and forms the two finger carriers 20 and 22.

The structure 100 here forms the notch 2020 wherein the support 202 of the endpiece 200 forming the two fingers 204 and 206 can engage. Alternatively, the notch 2020 could be arranged in another portion of the base 10.

Reference is now made to FIGS. 5 and 6.

The structure 100 comprises a body 110 by which it can be fastened to the base 10 of the microactuator 1. Here, the body 110 comprises the four screw holes 1001, 1002, 1003 and 1004 by which the structure 100 can be fastened to the base 10. The portion of the structure 100 forming the notch 2020 is not shown in FIG. 5, for the purposes of legibility, but is visible in FIG. 6. The notch 2020 is here formed in the body 110 of the structure 100.

The structure 100 comprises two walls 120 and 122 which form a housing 124 for the actuator 30 (not shown in FIGS. 5 and 6). The two walls 120 and 122 have a general bowl shape, for example in the shape of a "U" (or, alternatively, in the shape of a "V"), and face each other. The two walls 120 and 122 together form a first sub-structure 126 extended in a first direction 1260.

Here, the two walls 120 and 122 are symmetrical and of generally analogous shapes. Alternatively, the two walls 120 and 122 could be asymmetric and/or of general different shapes.

The first bowl-shaped wall 120 and the second bowl-shaped wall 122 each have a respective bottom 1200, 1220, a respective first edge 1202, 1222 and a respective second edge 1204, 1224 opposite the respective second edge 1202, 1222. The walls 120 and 122 are joined together on one side by their respective first edges 1202 and 1222 at a fastening portion 1262 and on the other side by their respective second edges 1204 and 1224 in a transmission portion 1264. Here, the two walls (therefore the two bowl shapes are facing each other) together form an extended hexagon of which the sides are two-by-two parallel.

The first sub-structure 126 is fastened to the body 110 by the fastening portion 1262. The fastening portion 1262 and the transmission portion are here thicker than the rest of the walls 120 and 122.

More generally, the two walls 120 and 122 form an extended hexagon. Alternatively, the two walls 120 and 122 could form a diamond, an ellipse, an oval or any other shape substantially extended in the first direction 1260.

The two walls 120 and 122 longitudinally house the actuator 30 (not shown in FIG. 5) in the housing 124. The actuator direction 32 of the actuator 30 mounted in the housing 124 coincides with the first direction 1260 of the first sub-structure 126. The actuator 30 is preferably mounted preloaded in the housing 126, i.e. continuously bearing against the bottom 1200, 1220 of each wall 120, 122, including in the idle state. The actuator 30 can optionally be glued to the bottoms 1200 and 1220 of the walls 120 and 122, in order to secure the mounting thereof and improve the service life of the microactuator.

Here, the bottoms 1200 and 1220 have respective parallel faces 1206 and 1226 and facing one another. The actuator 30 mounted in the housing 126 is in continuous contact with the faces 1206 and 1226.

The two walls 120 and 122 can be deformed. The actuator 30, when it expands (respectively contracts) along the first direction 1260 moves apart (respectively brings closer) the two bottoms 1200 and 1220 to one another. The two bottoms 1200 and 1220 which move apart (respectively move closer) to one another drive the mutual moving closer (respectively moving apart) of the fastening portion 1262 and the transmission portion 1264. The fastening portion 1262 being fastened to the body 110, the transmission portion 1264 is moved relatively to the body 110 and transmits the expansion (respectively the contraction) of the actuator 30. The transmission portion 1264 moves along a second direction 1266 substantially perpendicular to the first direction 1260 by a distance equal to the relative movement of the two bottoms 1200 and 1222 multiplied by a first predetermined amplification factor.

The first amplification factor depends on the geometry of the first sub-structure 126. In particular, the first amplification factor depends on the extending of the general shape of the first sub-structure 126 and on the thickness of the walls 120 and 122. In the embodiment described here, the first amplification factor is comprised between 2:1 and 7:1.

The structure 100 further includes a second sub-amplifying structure 130, opposite the first sub-structure 126 with respect to the transmission portion 1264. The second sub-amplifying structure 130 transmits the movement of the transmission portion 1264 to the finger carriers 20 and 22.

The second sub-structure 130 comprises for each finger carrier 20, 22 a respective arm 132, 134. Each arm 132, 134 is fastened at a respective first end 1320, 1340 to the transmission portion 1264. Each arm 132, 134 is fastened to its respective finger carrier 20, 22 at a respective second end 1322, 1342 opposite its respective first end 1320, 1340. The arms 132 and 134 are of a general extended shape, and extend longitudinally in the vicinity of one another, forming an angle of less than 10 degrees, preferably less than 5 degrees, with the second direction 1266.

The second sub-structure 130 further comprises for each finger carrier 20, 22 a respective articulation 136, 138. The articulations 136 and 138 make it possible to control the movement of the finger carriers 20 and 22 with respect to the body 110. The articulations 136, 138 are substantially symmetrical with respect to the second direction 1266. Here, the two articulations 136 and 138 are located on either side of the arms 132 and 134.

In an embodiment, each articulation 136, 138 comprises two respective extended rods 1360 and 1362 and 1380 and 1382. The two rods 1360 and 1362 (respectively 1380 and 1382) of the articulation 136 (respectively 138) are parallel and of the same length, or, in other words, form two opposite sides of a parallelogram. The two other sides of said parallelogram are expressed in a third direction 1300, which is optionally substantially perpendicular to the second direction 1266. This "parallelogram" arrangement of the two articulations 136 and 138 constrains the finger carriers 20 and 22 to move in parallel and symmetrically with respect to the second direction 1266. The angle between the longitudinal direction of the rods 1360, 1362, 1380 and 1382 and the second direction 1266 is less than 10°, preferably less than 5°.

When the transmission portion 1264 moves closer to (respectively moves apart from) the fastening portion 1262, the second sub-structure 130 drives the finger carriers 20, 22 via arms 132 and 134 in a moving closer (respectively moving apart) movement along the third direction 1300. The relative movement of the finger carriers 20 and 22 is equal to the relative movement of the transmission portion 1264 with respect to the fastening portion 1262 multiplied by a second predetermined amplification factor. In other words, the actuator travel of the finger carriers 20 and 22 is linear, and is expressed along the third direction 1300.

The second amplification factor depends on the geometry of the second sub-structure 130. In particular, this second amplification factor depends on the angle between the arms 132 and 134 and the second direction 1266, between the rods 1360, 1362, 1380 and 1382 and the second direction 1266, on the length of the rods 1360, 1362, 1380 and 1382, and on the length of the arms 132 and 134. In the embodiment described, the second amplification factor is greater than 2:1, and can be up to 15:1, even up to 20:1.

The total amplification factor of the structure 100 is equal to the product of the first amplification factor and of the second amplification factor. In the example described here, the total amplification factor of the structure 100 is 50:1, but could reach up to 140:1, which is considerably greater than the known amplifying structures. Furthermore, the movements of the finger carriers 20 and 22 are symmetrical and parallel together. The structure 100 therefore makes it possible to reach very high amplification factors, without the disadvantages of fragility, complexity or asymmetry of known amplification structures.

The relative stiffness of the general shape of the first sub-structure 126 increases the rigidity of the second sub-structure 130. Thus, the first sub-structure 126 provides mechanical stability to the entire structure 100. The shape of the second sub-structure 130 allows the structure 100 to reach a very high amplification factor. The second sub-structure 130 further provides parallelism and symmetry in the movement of the finger carriers 20, 22 of the structure 100. The two sub-structures 126 and 130 thus function in synergy.

The structure 100 is here of a single piece, and formed from a single profiled plate. The manufacture thereof is thus very simple, it is easy to assemble (four screws are sufficient). The structure 100 can be:
- machined by electro-erosion (EDM),
- machined by undercutting,
- injection molded (metal injection molding),
- manufactured by microsintering,
- carried out by additive manufacturing (also called "3D printing"), or
- carried out by physical-chemical silicon machining in a clean room (for example in the case of reduced-scale manufacturing).

These manufacturing methods are mentioned as examples and are not limiting.

The structure 100 makes it possible to reach an actuator travel between 50 μm and 3 mm. In the example described here, the actuator travel is about 800 μm, and the size of the microactuator is 45×23×7.5 mm. An actuator provided with such a structure 100 thus has a much more advantageous size/travel ratio than the actuators provided with known amplifying structures.

In the structure 100, the arms 132 and 134 and the articulations 136 and 138 can pivot at their ends with respect to the body 110, to their respective finger carrier 20, 22 and to the transmission portion 1264, by deformation at their ends. The deformations are elastic, due to the movements of the various portions of the body 110 which are very low, about less than 2° and less than 2 mm.

The arms 132 and 134 and/or the rods 1360, 1362, 1380 and 1382 can have thinned ends. In the example shown in FIG. 5, the ends of the arms 132 and 134 and of the rods 1360, 1362, 1380 and 1382 are all thinned. The thinning of said ends improves the capacity of the arms 132 and 134 and of the rods 1360, 1362, 1380 and 1382 to pivot with respect to thereupon they are respectively fastened.

Optionally, the body can have recesses 1100 and 1102 at the junction between the respective first edges 1202 and 1222 of the walls 120 and 122. This makes it possible to avoid having sharp edges at this junction between the walls 120 and 122 and the body 110, which decreases therein the local constraints in the material of the structure 100.

The structure 100 thus described has an amplification factor, simplicity in design and manufacturing which are much more advantageous than the amplifying structures of the state of the art.

In the embodiment described here, the structure 100 has a flat symmetry with respect to a plane of symmetry perpendicular to the first direction 1260. The plane of symmetry contains the second direction 1266. The plane of symmetry is located between the two arms 132 and 134, between the two bowl-shaped walls 120 and 122 and between the finger carriers 20 and 22. The flat symmetry of the structure 100 allows the finger carriers to be moved symmetrically with respect to one another.

It is possible as an alternative to invert the two pairs of rods and the two articulations 136 and 138, i.e. connect the transmission portion 1264 to the two finger carriers 20, 22 by the two respective pairs of rods 1360, 1362 and 1380, 1382, and connect the two finger carriers 20, 22 to the body by the two arms 132 and 134.

Reference is now made to FIG. 7.

In this embodiment, which is an alternative of the embodiment of FIG. 5, the structure 100 has a third sub-structure 230 in place of the second sub-structure 130. Here, each articulation of the third sub-structure 230 is formed by a single rod 236, 238. This rod 236, 238 is solidly fastened at a first end 2360, 2380 of its respective finger carrier 20, 22, and is pivotably fastened to the body 110 at a second end 2362, 2382.

The structure 100 is here of a single piece and the pivoting at the second ends 2362, 2382 is done via elastic deformation at the junction 2364, 2384 between the body 110 and the second end 2362, 2382. The second ends 2362 and 2382 can be thinned in such a way as to improve this pivoting by elastic deformation.

The movement of the finger carriers 20 and 22 is symmetrical. As there is now only one single pivoting in the third structure 230, the finger carriers 20 and 22 describe an angular movement around the junction 2364, 2368.

This third structure 230 has an amplification factor that is higher than that of the second sub-structure 130, at the price of losing the parallelism of the movements of the finger carriers 20 and 22.

A globally symmetrical amplifying structure 100 has been described. This symmetry allows the terminal members to move symmetrically. However, it is possible to have an asymmetric structure 100 that would retain a very high amplification factor and a solidity much higher than that of known structures, thanks to the low number of parts and their simplicity.

An amplifying structure 100 intended for a microactuator of the microtechnology clamp type has been described. The amplifying structure according to the invention makes it possible to move via piezoelectric control terminal members over very precise distances, that are symmetrical and even parallel. This opens the door to many applications in addition to microtechnology clamps.

In an embodiment, the microactuator 1 is a microtechnology electric contactor. The two terminal members 20 and 22 each comprise a respective contact member, said two contact members being electrically connected when they are in contact with one another. The actuator 30 then drives the terminal members to switch the contact members between a passing state (where the contact members are in contact) and a cut off state (where the contact members are at a distance from one another and electrically separated).

Thanks to the amplifying structure, this microtechnology electric contactor is very compact, active and controllable, in particular with very low control currents of the actuator. Furthermore, the clamping force that the terminal members can develop makes it possible to consider the use of such an actuator in situations of strong currents or strong voltages. The switching of this microtechnology electric contactor is fast, less than 10 ms, even less than 1 ms.

In another embodiment, the microactuator is an optical diaphragm or an optical shutter. Here, the terminal members each comprise a respective demi-diaphragm. The two demi-diaphragms have a general "V" shape with a right angle, and are symmetrically facing one another, with their respective corners at a distance from one another. The two general "V" shapes overlap, the two demi-diaphragms together forming a square diaphragm. The two demi-diaphragms move apart and move closer under the effect of the actuator, which makes it possible to control the dimensions of the square diaphragm that they form.

Here again, actuating speed of the microactuator is advantageously short (less than 10 ms, even 1 ms). The size of the diaphragm can be very precisely controlled. The diaphragm further remains centered on an optical axis.

The invention is not limited to the examples mentioned hereinabove, and is of interest in all fields where the precise movement of two terminal members over short distances symmetrically, even in parallel, is required.

The invention claimed is:

1. A device for a microactuator comprising
   a body (110),
   two terminal members (20, 22) articulated (136, 138; 236, 238) on the body (110), located on one side of the body (110),
   two deformable bowl-shaped walls (120, 122) which face one another, arranged to house an actuator (30), two respective first edges (1202, 1222) of said walls (120, 122) located on one side being fastened (1264) on the body (110), whereas two respective second edges (1204, 1224) of said walls (120, 122) located on another side move consecutively to a deformation of the walls (120, 122) under the effect of the actuator (30),
   said movement being transmitted by two arms (132, 134) which terminate at the two respective terminal members (20, 22)
   wherein the bowl-shaped walls (120, 122) each have a respective bottom (1200, 1220) against which the actuator (30) bears,
   wherein the deformation of the actuator (30) is a longitudinal expansion or a longitudinal contraction against the two bottoms (1200, 1220) of the walls (120, 122),
   wherein an expansion of the actuator (30) against the two bottoms (1200, 1220) drives a coming closer together of the first edges (1202, 1222) and of the second edges (1204, 1224), by which the second edges (1204, 1224) symmetrically drive a relative coming closer together of the terminal members (20, 22) via arms (132, 134), and wherein a contraction of the actuator (30) against the two bottoms (1200, 1220) drives a moving apart of the first edges (1202, 1222) and of the second edges (1204, 1224), by which the second edges (1204, 1224) symmetrically drive a relative moving apart of the terminal members (20, 22) via arms (132, 134).

2. The device according to claim 1, wherein the two terminal members (20, 22) are articulated on the body (110) by respective rods (1360, 1362, 1380, 1382; 2360, 2380).

3. The device according to claim 2, wherein the two terminal members (20, 22) are articulated on the body (110) by two respective pairs of rods (1360, 1362; 1380, 1382) substantially parallel and of the same length.

4. The device according to claim 3, wherein the ends (1322, 1342) of the rods (1360, 1362, 1380, 1382) on the terminal member (20, 22) side are substantially aligned.

5. The device according to claim 3, wherein the rods (1360, 1362, 1380, 1382; 2360, 2380) and/or the arms (132, 134) are thinned at one or more of their ends (1320, 1322, 1340, 1342; 2362, 2382).

6. The device according to claim 2, wherein the rods (1360, 1362, 1380, 1382; 2360, 2380) and/or the arms (132, 134) are thinned at one or more of their ends (1320, 1322, 1340, 1342; 2362, 2382).

7. The device according to claim 1, wherein the relative coming closer together and the relative moving apart of the terminal members is generally expressed along a linear travel (1300).

8. The device according to claim 1, wherein the two bowl-shaped walls (120, 122) generally form a diamond, hexagon or an oval.

9. The device according to claim 1, wherein the device (100) is made from a single piece.

10. The device according to claim 1, wherein the device (100) is formed from a profiled plate.

11. The device according to claim 1, wherein the device has an amplification ratio greater than 30:1.

12. The device according to claim 1, wherein the microactuator is a microtechnology clamp, and the terminal members (20, 22) each comprise a finger carrier and a finger mounted on said finger carrier.

13. The device according to claim 1, wherein the actuator (30) is a piezoelectric actuator, or a piezoelectric stack (34).

14. The device according to claim 1, wherein the device is symmetrical with respect to a plane of symmetry located between the two walls (120, 122), between the two arms (132, 134) and between the two terminal members (20, 22).

\* \* \* \* \*